United States Patent
Borenstein et al.

(10) Patent No.: US 9,691,152 B1
(45) Date of Patent: Jun. 27, 2017

(54) MINIMIZING VARIATIONS IN CAMERA HEIGHT TO ESTIMATE DISTANCE TO OBJECTS

(71) Applicant: A9.com, Inc., Palo Alto, CA (US)

(72) Inventors: Eran Borenstein, Los Gatos, CA (US); Arunkumar Devadoss, Santa Clara, CA (US); Zur Nehushtan, Mountain View, CA (US)

(73) Assignee: A9.COM, INC., Palo Alto, CA (US)

( * ) Notice: Subject to any disclaimer, the term of this patent is extended or adjusted under 35 U.S.C. 154(b) by 35 days.

(21) Appl. No.: 14/827,002

(22) Filed: Aug. 14, 2015

(51) Int. Cl.
| | |
|---|---|
| *G06T 7/60* | (2017.01) |
| *G06T 7/00* | (2017.01) |
| *G06K 9/00* | (2006.01) |
| *H04N 5/232* | (2006.01) |
| *G06T 15/00* | (2011.01) |

(52) U.S. Cl.
CPC ........ *G06T 7/0042* (2013.01); *G06K 9/00288* (2013.01); *G06T 7/0028* (2013.01); *G06T 7/60* (2013.01); *G06T 15/00* (2013.01); *H04N 5/23219* (2013.01); *H04N 5/23293* (2013.01); *G06T 2215/16* (2013.01)

(58) Field of Classification Search
CPC ....... G06T 7/0042; G06T 7/0028; G06T 7/60; G06T 15/00; G06T 2215/16; G06T 7/73; G06K 9/00288; G01B 11/026; H04N 5/23219; H04N 5/23293

USPC .......................................................... 382/106
See application file for complete search history.

(56) References Cited

U.S. PATENT DOCUMENTS

| | | | | |
|---|---|---|---|---|
| 9,160,931 B2* | 10/2015 | Robinson | ........... | H04N 5/23293 |
| 2005/0094019 A1* | 5/2005 | Grosvenor | ............. | G03B 17/00 |
| | | | | 348/335 |
| 2011/0080489 A1* | 4/2011 | Chen | ...................... | H04N 5/225 |
| | | | | 348/222.1 |
| 2014/0362255 A1* | 12/2014 | Kuang | ............... | H04N 5/23293 |
| | | | | 348/231.5 |

* cited by examiner

*Primary Examiner* — Jon Chang
(74) *Attorney, Agent, or Firm* — Hogan Lovells US LLP

(57) ABSTRACT

Approaches provide for minimizing variations in the height of a camera of a computing device when estimating the distance to objects represented in image data captured by the camera. For example, a front-facing camera of a computing device can be used to capture a live camera view of a user. An application can analyze the image data to locate features of the user's face for purposes of aligning the user with the computing device. As the position and/orientation of the device changes with respect to the user, the image data can be analyzed to detect whether a location of a representation of a feature of the user aligns with the alignment element. Once the feature is aligned with the alignment element, a rear-facing camera (or other camera) can capture second image data of an object. The second image data can be analyzed to determine a geometric relationship between the rear-facing camera and the object, and the geometric relationship can be used to determine a distance to the object with respect to the computing device.

20 Claims, 12 Drawing Sheets

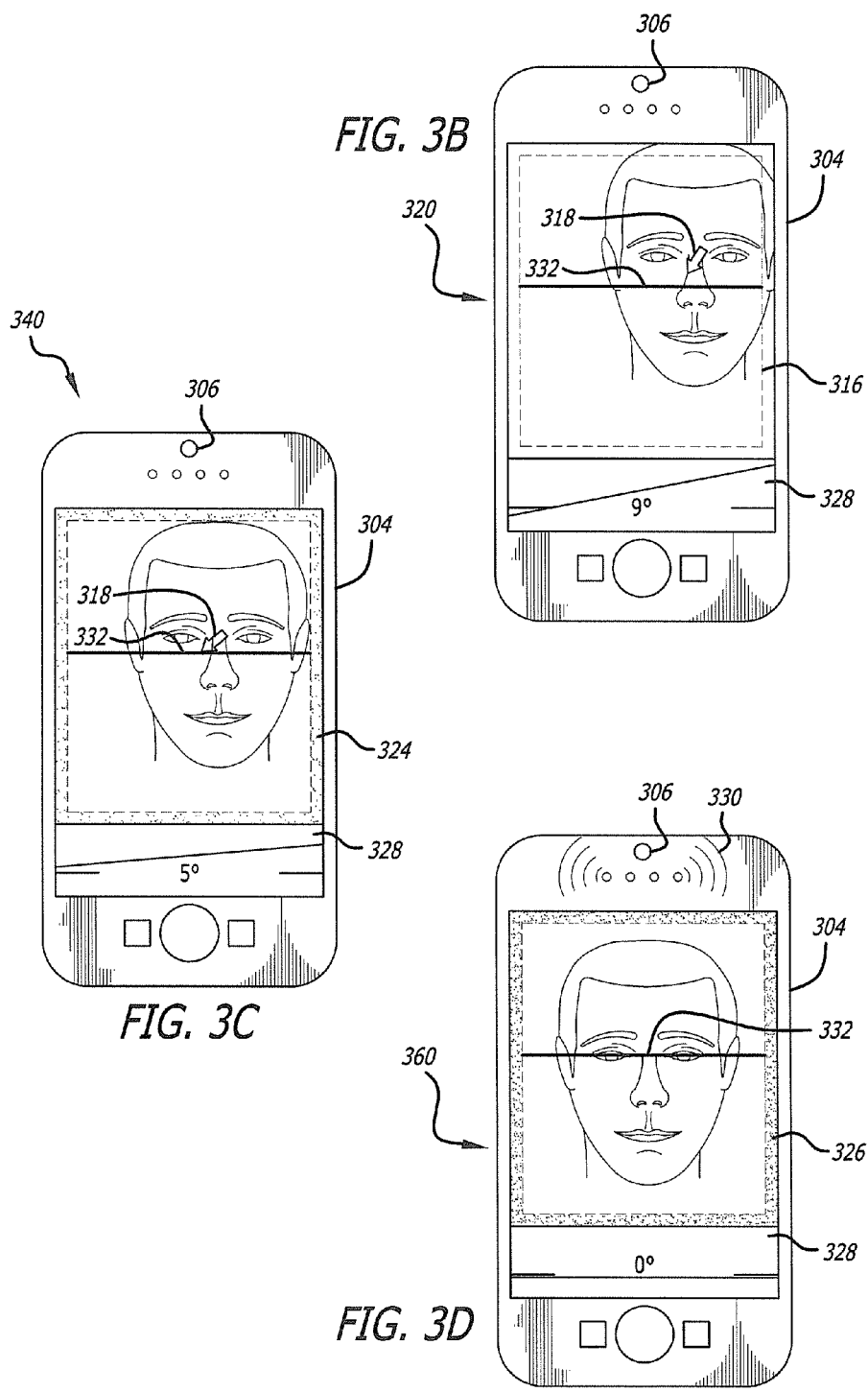

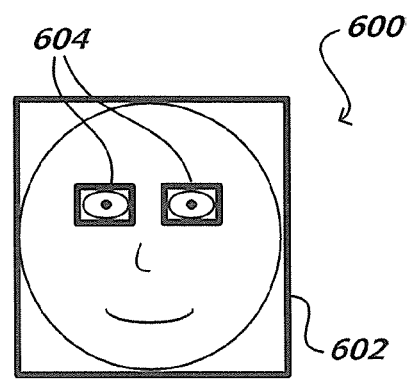
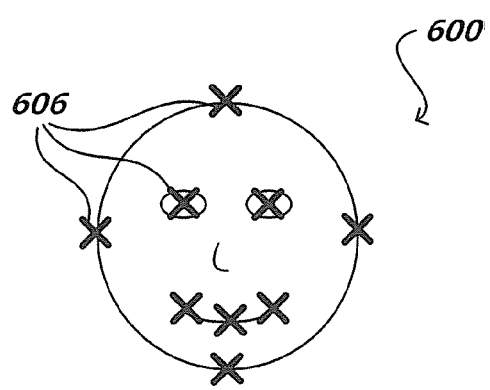
FIG. 6A
FIG. 6B
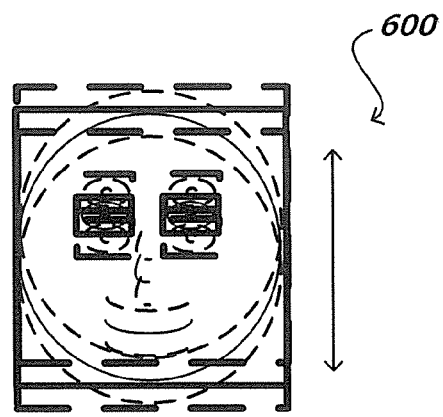
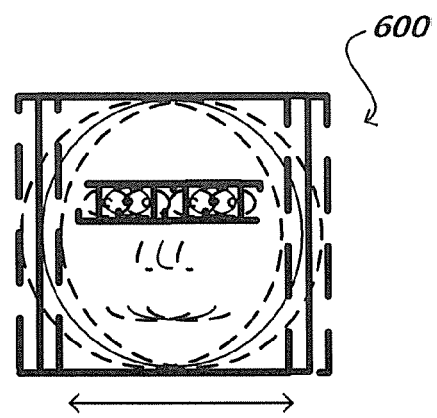
FIG. 6C
FIG. 6D

US 9,691,152 B1

MINIMIZING VARIATIONS IN CAMERA HEIGHT TO ESTIMATE DISTANCE TO OBJECTS

BACKGROUND

As personal electronic devices become increasingly sophisticated, people are using such devices in new and interesting ways. For example, personal or portable electronic devices, such as head-mounted displays (HMD) (e.g., glasses, goggles, or helmets), smart phones, tablets, portable media players, and e-book readers, can be used to "augment reality." That is, electronic devices can be used as a viewfinder into the real world and virtual elements can be overlaid to create a reality that is enhanced or augmented. Augmented reality can be implemented for applications as varied as visual design, medical care, gaming, navigation, or information retrieval. Conventional augmented reality systems and techniques that use a single camera and/or active vision; however, may not accurately determine the distance to physical objects positioned in the real world. As a result, the virtual elements that are overlaid on the representation of the physical objects may not be displayed at a correct scale. Further, in many conventional systems, error in determining camera height often times results in an error in the determined distance between a real world object and the computing device. This error in the determined distance can affect the scale of virtual elements that are overlaid on the representation of physical objects, which can be distracting, misleading, or even annoying for many users.

BRIEF DESCRIPTION OF THE DRAWINGS

Various embodiments in accordance with the present disclosure will be described with reference to the drawings, in which:

FIGS. 3A, 3B, 3C, and 3D illustrate an example approach for minimizing variations in camera height in accordance with various embodiments;

FIGS. 6A-6F illustrate example approaches to determining a relative orientation of a computing device with respect to a user of the computing device in accordance with various embodiments;

DETAILED DESCRIPTION

Figure 1:
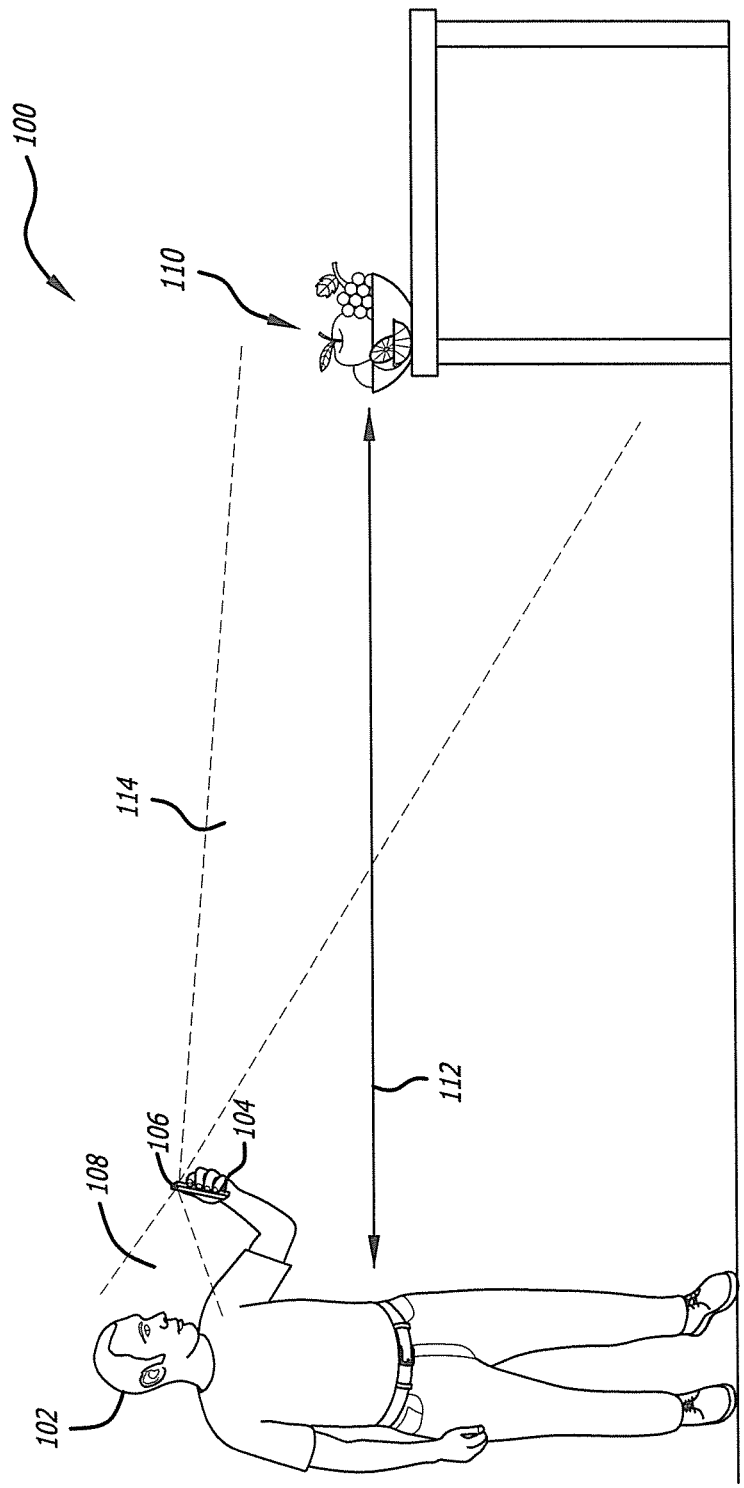
FIG. 1 illustrates an example environment in which aspects of the various embodiments can be utilized.

Systems and methods in accordance with various embodiments of the present disclosure may overcome one or more of the aforementioned and other deficiencies experienced in conventional approaches to determining distances between objects using an electronic device. In particular, various approaches provide for minimizing variations in the height of a camera of a computing device when estimating the distance to objects represented in image data (or video data) captured by the camera. For example, a front-facing camera of a computing device can be used to capture a live camera view of a user of the computing device. The live camera view can be presented to the user on a display screen of the computing device. An application executing on the computing device (or at least in communication with the computing device) can analyze the image data of the live camera view to locate one or more features of the user's face, such as the user's eyes, for purposes of aligning the user with the computing device. For example, one or more image analysis algorithms can be used to analyze the image data of the live camera view to perform face detection, alignment, and recognition, or another such process to identify a feature of interest, such as the user's eyes. In this example, the user's eyes are located within the field of view of the front-facing camera. As discussed elsewhere herein, however, aligning the user with the computing device can be accomplished using other features of the user, as may include the user's nose, mouth or other such features.

An alignment element or other such element can be displayed on the display screen. For example, the alignment element can be displayed in an overlay on the display screen. An example alignment element can be a horizontal line, a bounding box, or the like, and can be used to assist the user in aligning the user's eye or other feature with the alignment element. One or more visual or other like indicators or alerts (e.g., an audio alert, a haptic alert, etc.) can be used to further assist the user in aligning the user's eyes with the alignment element. The visual indicators can include, for example, a graphical element such as an arrow or other element indicating a direction of movement needed to align the use's eyes with the alignment element.

As the position and/or orientation of the device changes with respect to the user and/or the user's position and/or orientation of the user changes with respect to the computing device, the image data of the live camera view can be analyzed to detect whether a location of a representation of the eyes aligns with the alignment element to calibrate and bring the relative positions of the computing device and the user into a fixed canonical state. For example, in the situation where the alignment element is a horizontal line, aligning the user's eyes with the horizontal line can include intersecting both of the user's eyes with the horizontal line for at least a threshold period of time. Once the user's eyes are aligned with the alignment element, the relative position of the user and the camera is determined and a rear-facing camera can then capture second image data (or video data) of an object, where the object is located a distance from the computing device. The calibration information captured by the first image, together with the data captured by the second image, can be analyzed to determine a geometric relationship between the rear-facing camera and the object. The geometric relationship can be used to determine a distance to the object with respect to the computing device. For example, software executing on the computing device (or otherwise in communication with the computing device) can obtain information such as the angular field of view of the rear-facing camera, the zoom level at which the second image data is currently being captured, and any other such relevant information, which can enable the software to determine the distance to the object with respect to the computing device. Thereafter, information representative of the distance can be stored and/or used in any one of a number of applications.

Various other functions and advantages are described and suggested below in accordance with the various embodiments.

FIG. 1 illustrates an example environment 100 wherein a user 102 is operating a computing device 104. In this example, the user 102 is attempting to determine a distance 112 between the user (or computing device 104) and an object of interest 110. Although a portable computing device (e.g., a smart phone, an electronic book reader, or tablet computer) is shown, it should be understood that various other types of electronic device that are capable of determining and processing input can be used in accordance with various embodiments discussed herein. These devices can include, for example, notebook computers, personal data assistants, video gaming consoles or controllers, portable media players, and wearable computers (e.g., smart watches, smart glasses, etc.) among others. As would be understood to one skilled in the art, the distance can be between one of the user, camera of the computing device, the computing device, or some other reference point. For purposes of explanation, the distance is described as being between the user and the object of interest. It should be noted; however, that one of any number of image processing algorithms can be used to determine the distance between the object and any number of reference points, as may include the computing device, the camera of the computing device, among others.

In this example, the computing device 104 includes a front-facing camera 106 operable to capture image data (still images or video) of items or objects in the field of view 108 of the front-facing camera. The captured image data can be analyzed by an application executing on the computing device (or in communication with the computing device) to locate one or more features of the user that can be utilized to minimize variations in camera height. The device can include additional image capture elements as well, as may include at least one other camera (e.g., a rear-facing camera), a charge-coupled device (CCD), a motion detection sensor, or an infrared sensor, among others. As shown, the object of interest (e.g., a bowl of fruit) is within the field of view 114 of the rear-facing camera while at least a portion of the user (e.g., at least the user's face and/or shoulders) is in the field of view 108 of the front-facing camera. An application executing on the computing device (or at least in communication with the computing device) can analyze image data captured by the rear-facing camera to locate one or more features of the object of interest that can be used to determine a distance between the object of interest and the user.

As described, the determined distance can be used in one or more augmented reality approaches. However, conventional augmented reality systems and techniques may not accurately determine the distance between physical objects positioned in the real world and the user. For example, oftentimes single-camera computing devices cannot accurately determine the distance from the camera to the object of interest. As a result, the virtual elements that are overlaid on the representation of the physical objects may not be displayed at the correct scale. Further, in many conventional systems, the variations in camera height can change drastically between augmented reality sessions, which can cause the distance measurement between objects in the real world and the user to also change. As described, this can affect the scale of virtual elements that are overlaid on the representation of objects, which can be distracting, misleading, or even annoying for many users. Accordingly, approaches in accordance with various embodiments provide for minimizing variations in the height of a computing device that includes a camera when estimating the distance to objects captured in image data (or video data) by the camera using the height of the camera and accelerometer technique.

Figure 2:
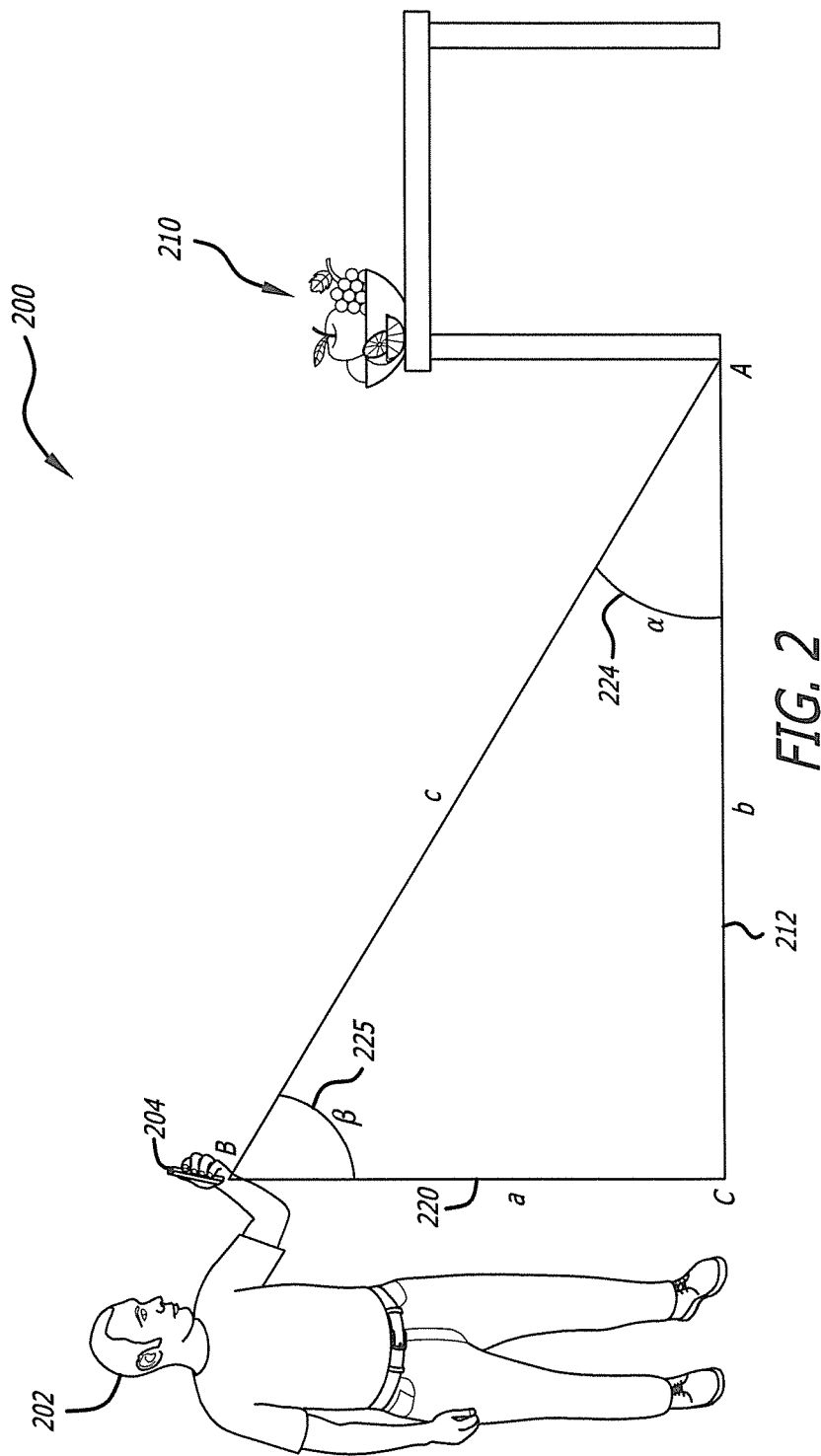
FIG. 2 illustrates an example situation for determining a distance to an object in accordance with various embodiments.

For example, FIG. 2 illustrates an example situation 200 of determining a distance to an object in accordance with various embodiments. In this example, a user 202 operating a computing device 204 is attempting to determine a distance 212 between the user and the object of interest 210. In accordance with various embodiments, the distance 212 can be estimated based on a geometric relationship between the user 202 (or computing device) and the object of interest 210. In this example, where the geometric relationship between the computing device 204 and the object of interest 210 approximates that of a right triangle, the geometric relationship can be represented by:

$$\tan \beta = b/a$$

where the computing device at point B, makes an angle β 225 measured with respect to a gravity vector BC and point A. In this example, point B represents the position of the computing device with respect to ground. Segment a represents the height 220 of the computing device with respect to ground. Point A represents the position of the object of interest when vertically projected to the ground. Segment b represents the distance 212 between the computing device and the object of interest. In the situation where the object of interest is positioned vertically above a substantially leveled floor, the distance b between the computing device at point B and the object of interest at point A can be represented by:

$$b = \tan \beta * a$$

where a 224 is the angle between the ground and the computing device. In accordance with various embodiments, the angle β can be determined using information obtained by an accelerometer or other inertial sensor (e.g., gyroscope) of the computing device and aspects of the coordinate system of the camera. The camera coordinate system can specify points in a plane using an ordered triplet of lines (axes) that are pair-wise perpendicular. The axes can include an x-axis, a y-axis, and a z-axis. The coordinates along the x-axis and the y-axis can refer to the pixel location (x, y) of a captured image, and the z-axis can refer to the optic axis of the camera. In this example, the z-axis is normal to the camera, and can be represented by the line BA shown in FIG. 2. In this example, the accelerometer will point in the direction of gravity (e.g., towards the ground along line BA) using the camera coordinate system as a reference. Based on the direction of the vector gravity and the direction the camera is pointed (i.e., z-axis), the angle β can be determined.

To estimate the distance 212 to the object of interest 210, the height 220 of the computing device with respect to the ground 220 is determined. A number of approaches can be used to determine the height 220. In one such approach, an object or other fiducial associated with a dimensions can be used to determine the height of the computing device with respect to the ground. Example objects include paper, objects (e.g., a mobile phone, currency), or any object with known dimensions.

The object is positioned on the ground proximate to the user. An example position can be at the user's feet, such as in front of the user's feet. The camera of the computing device is pointed at the object. For example, the camera of the computing device is positioned relatively in front of the user at a height the user would normally capture an image. For purposes of explanation, the camera is positioned near the user's eyes. It should be noted however, the camera can be positioned in one of any number of positions as may include the user's shoulder, chin, nose, etc. The computing device, at the height, is positioned horizontal to the ground where the camera is pointed generally at the object.

The computing device can capture an image of the object at the height. The image can be analyzed using an application executing on the computing device to determine the height of the computing device with respect to the ground. For example, based on the properties of the camera, the dimensions of the object as represented in the image, and the actual dimensions of the object, the height that the computing device at the time of taking the image can be determined. In accordance with various embodiments, in some situations maintaining horizontal alignment of the computing device with respect to the ground may be difficult. Accordingly, position data from at least one inertial sensor can be used to correct for imperfect horizontal alignment to allow for a more accurate height measurement.

In another approach, the computing device can be held at a first position and moved to a second position. The distance between the first position and the second position can be determined based on information captured by an inertial sensor and the distance can be used to determine the height of the computing device with respect to the ground. For example, the first position can correspond to where the user would normally capture a picture using the computing device, the second position can correspond to the ground, and the inertial sensor can measure the distance movement between the first position and the second position. Those skilled in the art will understand that any one of a number of approaches can be used to determine the height of the computing device with respect to a reference plane, and the examples described are for purposes of explanation.

As described, the height at which the user captures an image may change, which can cause the distance between the computing device and object to also change. For example, the user may capture an image of the object at their shoulder level, eye level, among other such places. However, in the situation where the user does not calibrate the height of the computing device before determining the distance between the computing device and the object, the computing device may use the last known height, which may be different than the actual height of the computing device at the time of capturing the image of the object. This error in the height of the computing device can result in an error in calculating the distance between the computing device and the object. Accordingly, approaches in accordance with various embodiments attempt to reduce this error by minimizing variations in the camera height.

Figure 3A:
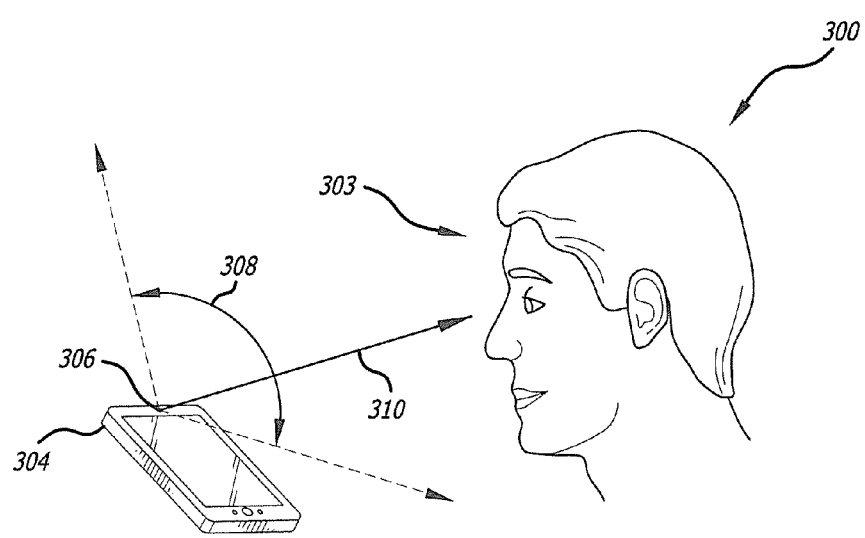

For example, FIGS. 3A, 3B, 3C, and 3D illustrate an example approach for minimizing variations in camera height in accordance with various embodiments. FIG. 3A illustrates an example situation 300 wherein a user 303 is interacting with a computing device 304. In this example, the computing device 304 includes a front-facing camera 306 operable to perform functions such as image and/or video capture. The computing device also includes an image capture element (not shown) positioned on the back surface of the device to capture image data corresponding to the viewing perspective of the user. The image capture element may be, for example, one or more cameras, charge-coupled devices (CCDs), motion detection sensors, ambient light sensors, infrared sensors, or some combination thereof, among many other possibilities. In some embodiments, the imaging element of the computing device can include multiple cameras, including at least one wide-angle optical element, such as a fish eye lens, on each of the front surface and the back surface of the device, that enables the device to capture images over a wide range of angles, up to 360 degrees vertically or horizontally, with respect to the device. Further, each image capture element can comprise a digital still camera, configured to capture subsequent frames in rapid succession, or a video camera able to capture streaming video. In this example, the user 303 is located in a relative position with respect to the device, such that the point of view of the user follows a determinable trajectory 310 between the user's head or eyes and the device. The front-facing camera of the device is used to capture a live camera view of the field of view 308 that includes the user, and the live view can update as the user's point of view relative to the computing device changes as a result of movement of the user and/or the computing device as well as a change in the orientation of the device.

FIG. 3B illustrates an example situation 320 where an application executing on the computing device 304 (or at least in communication with the computing device) can analyze the image data captured by the front-facing camera to locate one or more features of the user's face, such as the user's eyes, for purposes of aligning the user with the computing device. For example, one or more image analysis algorithms can be used to analyze the image data to perform patter recognition, shape recognition, or another such process to identify a feature of interest, such as the user's eyes. In this example, the user's eyes are located within the field of view of the front-facing camera 306. An alignment element 332 or other such visual component can be displayed in an overlay or otherwise provided on the display screen. An example alignment element can be a horizontal line, a bounding box, or the like, and can be used to assist the user in positioning the user's eye or other feature with respect to the computing device.

One or more alerts (e.g., visual elements, sound alerts, haptic alerts, etc.) can be used to further assist the user in aligning the user's eyes with the alignment element. The alerts can include, for example, a graphical element such as an arrow or other element indicating a direction of movement needed to align the use's eyes with the alignment element, a level 328 that indicates the tilt of the device with respect to a reference plane, a bounding box 316 that can change in appearance to indicate how aligned the user's eyes are with the alignment element, among other such alerts. As shown in FIG. 3B, arrow 318 is a visual indicator that indicates the direction the user should move their head to align their eyes with the alignment element 332. An appearance of bounding box 316 can also be used assist the user in aligning their eyes with the alignment element 332. Characteristics of appearance of the bounding box can include the color of the bounding box, the size of the bounding box, animation of the bounding box, or other visual features that can affect the appearance of the bounding box.

Upon detecting a change in position and/or orientation of the device or user with respect to the computing device, the live camera view can be updated, as well as the visual indicator 318 and bounding box 316. For example, as shown in situation 340 of FIG. 3C, the direction of the visual indicator 318 is updated based on the current position of the user's eye with respect to the alignment element, the level 328 is updated due to changes in tilt of the computing device, and the bounding box is emphasized also based on the current position of the user's eye with respect to the alignment element. In accordance with various embodiments, as the position and/or orientation of the device or user (or feature of the user) with respect to the computing device changes, at least one of the visual indicator 318, bounding box 316, or level 328 is updated.

The image data of the live camera view can be analyzed to detect that a location of a representation of the user's eyes align with the alignment element 332 within a threshold deviation, as shown in situation 360 of FIG. 3D. In the situation where the alignment element is a horizontal line, aligning the user's eyes with the horizontal line can include intersecting both of the user's eyes with the horizontal line for at least a threshold period of time. In certain embodiments, the computing device may also have to be leveled within an allowable deviation to complete the alignment process. Once the user's eyes are aligned with the alignment element (and in certain situations the computing device is leveled within an allowable deviation), at least one action can be triggered. Actions can include, for example, an audio alert 330 indicating that the user's eyes are aligned with the alignment element, emphasizing bounding box 324 to indicate that the user's eyes are aligned with the alignment element, capturing second image using, for example, a rear-facing camera or other camera of the computing device, among other possible actions.

The second image data can be captured in response to the user selecting a shutter (e.g., a physical or electronic shutter element) button of the computing device. In the situation where the rear-facing camera captures second image data of an object, the second image data can be analyzed to determine a geometric relationship between the rear-facing camera and the object, and the geometric relationship can be used to determine a distance between the user and the object. For example, software executing on the computing device (or otherwise in communication with the computing device) can obtain information such as the angular field of view of the rear-facing camera, the zoom level at which the image data is currently being captured, and any other such relevant information that can enable the software to determine a distance to the object with respect to the computing device. Other examples of determining the distance can include at least some of the approaches described with respect to FIG. 2.

Figure 4:
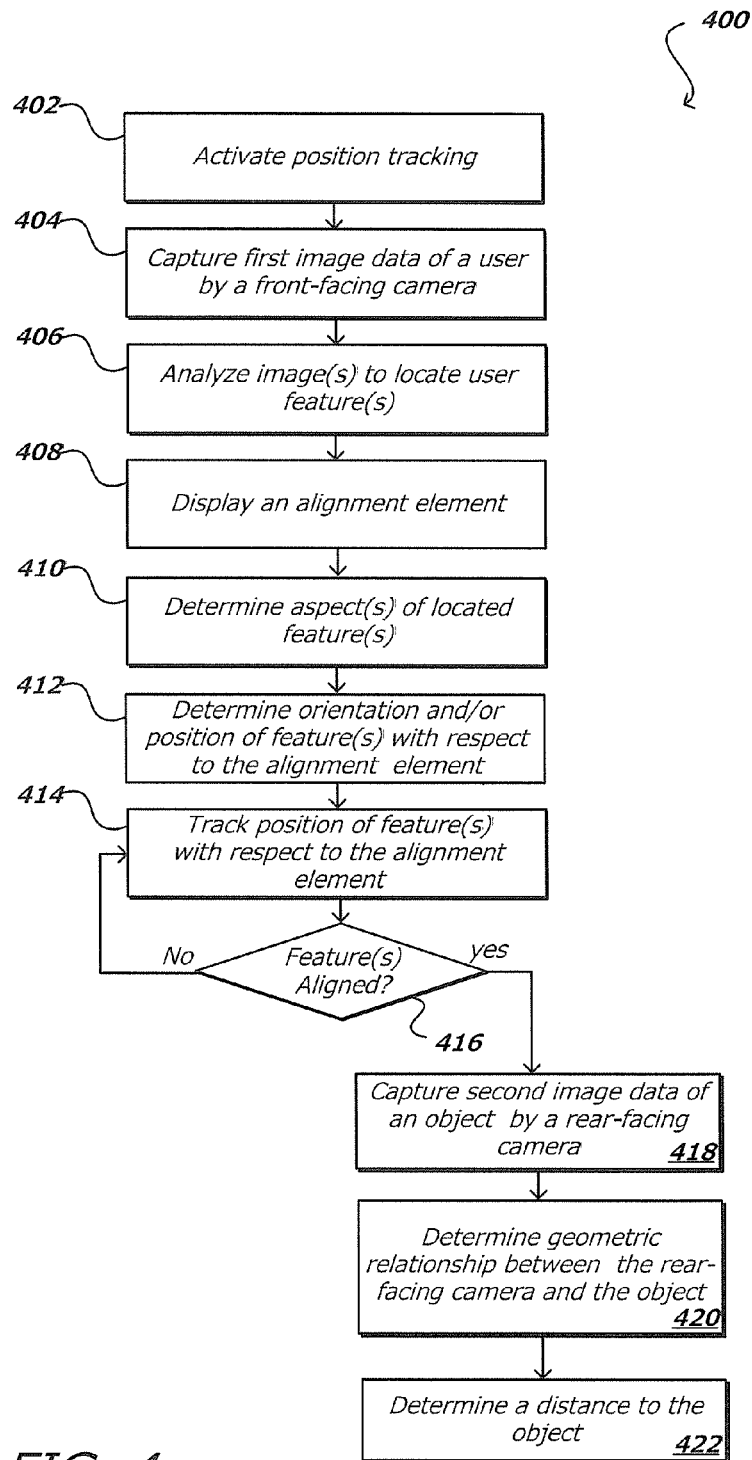
FIG. 4 illustrates an example process for minimizing variations in camera height in accordance with various embodiments.

FIG. 4 illustrates an example process for minimizing variations in camera height in accordance with various embodiments. It should be understood that, for any process discussed herein, there can be additional, fewer, or alternative steps performed in similar or alternative orders, or in parallel, within the scope of the various embodiments unless otherwise stated. In this example, position tracking of a viewer is activated 402 on the device. In some embodiments a user may activate this mode manually, while in other modes the device can activate the mode automatically when a person is detected nearby. Other modes of activation are possible as well, such as upon a user opening a specific application on the device. When the position tracking is active, a camera (e.g., camera 306 of FIG. 3A) of the device can begin imaging to capture 404 first image data such as still images or video of a user of the device. In some embodiments, the imaging will involve ambient light image or video capture, while in other embodiments a device can utilize infrared imaging, heat signature detection, or any other such approach. The device can analyze 406 the captured images to attempt to locate features of a user, or at least a person nearby, where those features in some embodiments include at least the eyes, nose, or head of a user (such approaches described in FIG. 6). In some embodiments, the device will attempt to locate an object that is shaped like a human head and that contains two eye-like features. In other embodiments, facial recognition or any other such algorithm can be used to attempt to determine the presence of a human head, or other portion or feature of a user, in the field of view of at least one of the imaging elements.

Once the user features are located, the device can display 408 an alignment element or other such element. For example, the alignment element can be displayed in an overlay on the display screen. As described herein, an example alignment element can be a horizontal line, a bounding box, or the like, and can be used to assist the user in positioning the user's eye or other feature with respect to the computing device. Once the alignment element is displayed, the device can attempt to determine 410 aspects or information relating to those features such as the approximate location of the features of the user. In this example, the determined aspects can be used to attempt to determine 412 a relative orientation and/or position between the device and the user, as well as the orientation and/or position of those features relative to the device in at least some embodiments, which can be useful in determining whether the features align with the alignment element.

For example, software executing on the computing device (or otherwise in communication with the computing device) can obtain information such as the angular field of view of the camera, the zoom level at which the information is currently being captured, and any other such relevant information, which can enable the software to determine a position of at least one of the user's eyes with respect to the camera. As the viewer tilts, rotates, or otherwise changes the orientation of the device, or as the viewer's relative position and/or orientation changes with respect to the device, the position of the user's eyes or other bodily feature (e.g., nose, mouth, ears, should, etc.) can be tracked 414 with respect to the alignment element or at least the computing device. For example, the determined aspects of the user then can be tracked over time, such as by continuing to capture and analyze image information to determine the relative position of the feature(s) and/or orientation of the device. In at least some embodiments, an orientation-determining element such as an accelerometer or electronic gyroscope can be used to assist in tracking the relative location of the user and/or current relative orientation of the device.

As changes in position and/or orientation of the feature are determined, the device can determine 416 whether the feature aligns with the alignment element. In the situation where the device determines that the feature is not aligned with the alignment element within a threshold deviation, the device can continue to track 414 the relative position of the feature of the user. In this situation, one or more visual or other like indicators or alerts (e.g., sound, haptic, etc.) can be used to further assist the user in aligning their eyes with the alignment element. The visual indicators can include, for example, a graphical element such as an arrow or other element indicating a direction of movement needed to align the use's eyes with the alignment element.

In the situation where the device determines that the feature of the user is aligned with the alignment element, the device begins imaging with a second camera such as a rear-facing camera to capture 418 second image data (image data or video data. The second image data can include, for example, the object of interest (i.e., the object the user wants to determine the distance to). The second image data can be analyzed to determine 420 a geometric relationship between the rear-facing camera and the object of interest. For example, software executing on the computing device (or otherwise in communication with the computing device) can obtain information such as the angular field of view of the rear-facing camera, the zoom level at which the second image data is currently being captured, and any other such relevant information, which can enable the software to determine 422 a distance to the object of interest with respect to the computing device.

In accordance with various embodiments, the second image data may include other objects near or around the object of interest. For example, the object of interest may be near, for example, paintings, wall sockets, light switches, among other such objects. In this situation, software executing on the device (or in communication with the device) can analyze the second image data using at least one object recognition algorithm to identify at least one of the other objects. In response to identifying an object, information representative of the dimensions of the object can be retrieved. As described, the information can be retrieved locally on the computing device or from a system remote the computing device. The information as well as the geometric relationship between the computing device and the object can be used to determine a distance to the object.

In accordance with various embodiments, the distance information associated with the object can be used additionally or instead of the distance information associated with the object of interest. For example, the distance information associated with the object can be used to verify or otherwise check the distance information associated with the object of interest. In this situation, if the distances represented by the respective distance information vary by more than a threshold amount, the computing device can select one of the distances. In another example, the device can take the average of the two distances and use that distance for various purposes.

Figure 5:
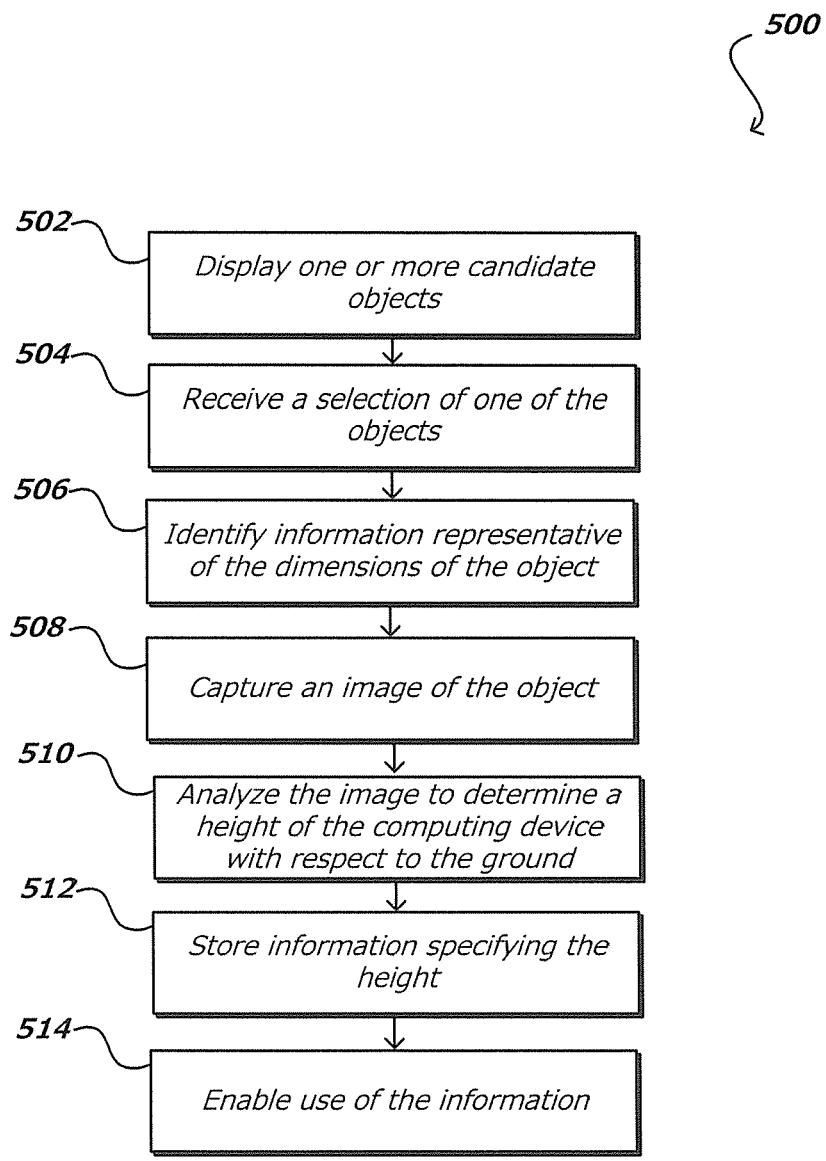
FIG. 5 illustrates an example process for calibrating a camera height in accordance with various embodiments.

FIG. 5 illustrates an example process 500 for calibrating camera height in accordance with various embodiments. As described in various embodiments, to estimate the distance to an object in the field of view of a camera of a computing device, the height of the computing device with respect to the ground may be required. In one such approach, an object can be used to determine the height of the computing device with respect to the ground. In this example, an application executing on the computing device may cause to be displayed an interface that displays 502 one or more candidate objects to be used to determine a height of the camera with respect to the ground. Example objects include paper, objects (e.g., a mobile phone, currency), or any object with known dimensions or dimensions that can be determined. A selection of one of the objects can be received 504. In response to receiving the selection, information representative of the dimensions of the object can be identified 506 or otherwise retrieved. There are several approaches to identifying the dimensions of the object. In one such approach, the objects displayed on the display screen or identified are associated with information that specifies the dimension of a respective object. The dimensions can include, for example, a width, a length, and a height, among other such dimensions of the object. In response to the user selecting one of the objects, the computing device retrieves the information associated with the dimensions of the selected object. The information can be retrieved form storage locally on the computing device or from a system remote the computing device. In accordance with various embodiments, in some situations the dimensions of the object may not be known, such as in the situation where the user uses an object not displayed or otherwise offered for selection by the computing device. In this situation, the user can input or otherwise provide the dimensions of the object into an interface displayed on the computing device.

The computing device can capture 508 an image of the object. For example, the object can be positioned on the ground proximate to the user. An example position can be at the user's feet, such as in front of the user's feet. The camera of the computing device is positioned relatively in front of the user at a height the user would normally capture an image. For purposes of explanation, the camera is positioned near the user's eyes. It should be noted however, the camera can be positioned in one of any number of positions as may include the user's shoulder, chin, nose, etc. The computing device, at the height, is positioned horizontal to the ground where the camera is pointed generally at the object. The image can be analyzed 510 using an application executing on the computing device to determine the height of the computing device with respect to the ground. For example, based on the properties of the camera, the dimensions of the object as represented in the image, and the actual dimensions of the object, the height of the computing device at the time of taking the image can be determined.

In accordance with various embodiments, in some situations maintaining horizontal alignment of the computing device with respect to the ground may be difficult due to movement of the device by the user or other such movement. Accordingly, position data from at least one inertial sensor can be used to correct for imperfect horizontal alignment allowing for a more accurate height measurement. Information specifying the height can be stored 512 in at least one storage device. The information can be stored locally on the computing device in at least one storage component or can be stored in a storage component remote the computing device. Thereafter, access to the information is enabled 514.

In accordance with an embodiment, to determine dimensions of the object, the user may instead capture an image of the object at the height the user would normally capture an image, and the device can use at least one object recognition algorithm to identify the object. In response to identifying the object, information representative of the dimensions of the object can be retrieved. As described, the information can be retrieved locally on the computing device or from a system remote the computing device.

As described, various approaches can be utilized for locating one or more desired features of a user's face to determine various aspects useful for determining relative orientation and/or position of the user's face and/or features of the user. As described, the located features are tracked and used for determining a proper position of the user with respect to the computing device. In this example, an image can be analyzed to determine the approximate location and size of a user's head or face. FIG. 6A illustrates an example wherein the approximate position and area of a user's head or face 600 is determined and a virtual "box" 602 is placed around the face as an indication of position using one of a plurality of image analysis algorithms for making such a determination. Using one algorithm, a virtual "box" is placed around a user's face and the position and/or size of this box is continually updated and monitored in order to monitor relative user position. Similar algorithms can also be used to determine an approximate location and area 604 of each of the user's eyes (or in some cases the eyes in tandem). By determining the location of the user's eyes as well, advantages can be obtained as it can be more likely that the image determined to be the user's head actually includes the user's head, and it can be determined that the user is facing the device. Further, the relative movement of the user's eyes can be easier to detect than the overall movement of the user's head when performing motions such as nodding or shaking the head back and forth. Monitoring box size also helps to provide distance information as well as directional information, which can be helpful when generating a three-dimensional model for modifying image information based on relative user position.

Various other algorithms can be used to determine the location of features on a user's face that can be utilized in the various approaches described herein. For example, FIG. 6B illustrates an example wherein various features on a user's face are identified and assigned a point location 606 in the image. The system thus can detect various aspects of user features and can determine more subtle changes in orientation. Such an approach provides advantages over the general approach of FIG. 6A in certain situations, as various other features can be determined, in case the user's eyes cannot be seen due to glasses, hair, etc.

Figure 6E:
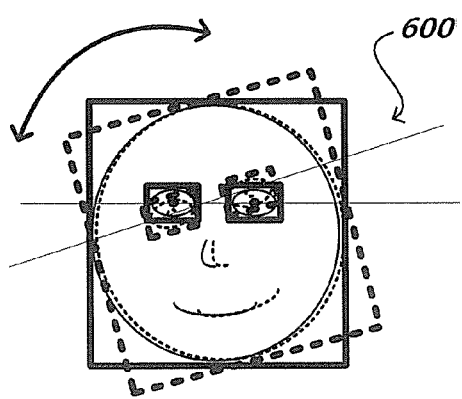
Figure 6F:
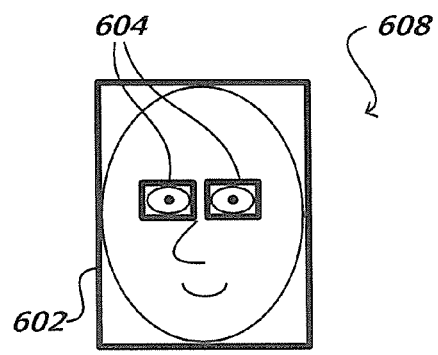

Once the positions of facial features of a user are identified, relative motion between the user and the device can be detected and utilized as input. For example, FIG. 6C illustrates an example where the user's head 600 is moving up and down with respect to the viewable area of the imaging element. As discussed, this could be the result of the user moving his or her head, or the user moving the device up and down, etc. FIG. 6D illustrates a similar example wherein the user is moving right to left relative to the device, through movement of the user, the device, or both. As can be seen, each movement can be tracked as a vertical or horizontal movement, respectively, and each can be treated differently as an input to modify a displayed image. As should be understood, such a process also can detect diagonal or other such movements. FIG. 6E further illustrates an example wherein the user tilts the device and/or the user's head, and the relative change in eye position is detected as a rotation. In some systems, a "line" that corresponds to the relative position of the eyes can be monitored, and a shift in angle of this line can be compared to an angle threshold to determine when the rotation should be interpreted as input. FIG. 6F illustrates another advantage of using an approach such as that described with respect to FIG. 6B to determine the position of various features on a user's face. In this exaggerated example, it can be seen that the features of a second user's head 608 have a different relative position and separation. Thus, the device also can not only determine positions of features for a user, but can distinguish between different users.

Figure 7A:
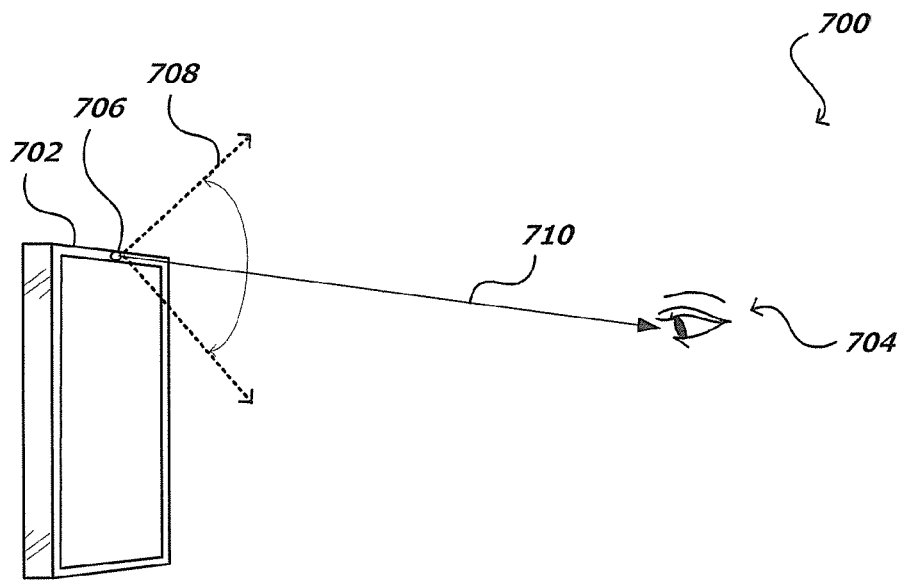
FIGS. 7A and 7B illustrate an example approach to determining the relative position of a user that can be utilized in accordance with various embodiments.

In at least some embodiments, a computing device can utilize one or more cameras or other such sensors to determine the relative direction of the user. For example, FIG. 7A illustrates an example situation 700 wherein a computing device 702 is configured to utilize at least one camera element 706 to attempt to locate a feature of a user, such as the user's head or eyes, for purposes of point of view determination. In this example, the user's eyes 704 are located within the field of view 708 of a camera of the computing device 702. As discussed elsewhere herein, however, the point of view of a user can be determined using positions of the user's eyes, pupils, head, or other such features that can be indicative of at least a general point of view. In some embodiments, the device might look for an object held by or otherwise associated with a user to determine a general point of view for rendering. Further, in some embodiments a device might utilize at least two different cameras positioned on the device with a sufficient separation such that the device can utilize stereoscopic imaging (or anther such approach) to determine a relative position of one or more features, with respect to the device, in three dimensions. It should be understood that there can be additional imaging elements of the same or a different type at various other locations on the device as well within the scope of the various embodiments.

Software executing on the computing device (or otherwise in communication with the computing device) can obtain information such as the angular field of view of the camera, the zoom level at which the information is currently being captured, and any other such relevant information, which can enable the software to determine an approximate direction 710 of at least one of the user's eyes with respect to the camera. In many embodiments, direction information will be sufficient to determine whether the user is aligned with the computing device within an acceptable deviation. In at least some embodiments, however, it can also be desirable to monitor the position and/or orientation of the user with respect to the device in order to provide a more consistent and accurate determination of alignment of the user with the device. In some embodiments, methods such as ultrasonic detection, feature size analysis, luminance analysis through active illumination, or other such distance measurement approaches can be used to assist with position determination. In other embodiments, a second camera can be used to enable distance determinations through stereoscopic imaging. Once the direction vectors from at least two image capture elements are determined for a given feature, the intersection point of those vectors can be determined, which corresponds to the approximate relative position in three dimensions of the respective feature as known for disparity mapping and other such processes.

Figure 7B:
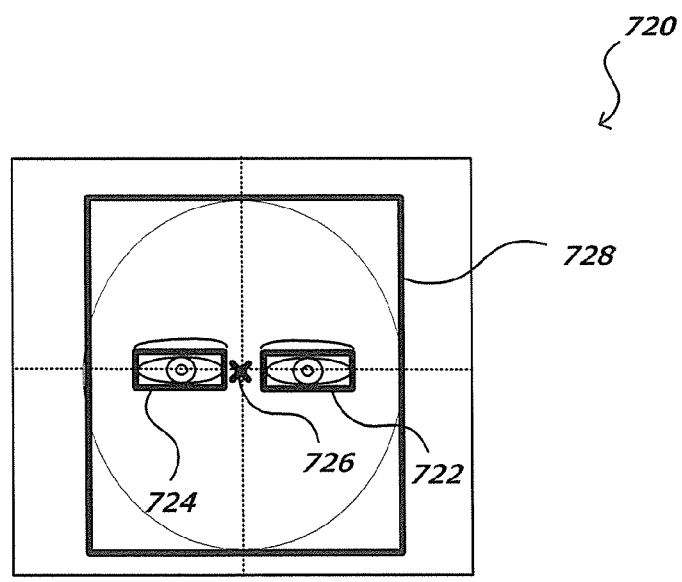

Further illustrating such an example approach, FIG. 7B illustrates an example image 720 that could be captured of the user's head and eyes using the camera 706 of FIG. 7A. One or more image analysis algorithms can be used to analyze the image to perform pattern recognition, shape recognition, or another such process to identify a feature of interest, such as the user's eyes. Approaches to identifying a feature in an image, such may include feature detection, facial feature extraction, feature recognition, stereo vision sensing, character recognition, attribute estimation, or radial basis function (RBF) analysis approaches, are well known in the art and will not be discussed herein in detail. As illustrated in this example, both eyes of the user might be able to be located in the captured image information. At least some algorithms are able to determine an approximate location or region 722, 724 for each eye, or at least an approximate location 728 of the user's head, where at least one of those locations or regions is used for point of view determinations. Depending on factors such as the desired level of sensitivity and distance between the user and the device, however, such information can impact the accuracy of the point of view determinations. Approaches in accordance with various embodiments can take advantage of the fact that the human brain combines and processes information from both eyes to provide a "single" point of view. Thus, the software can attempt to determine an intermediate point 726 between the user's eyes to use for the user's point of view. Various other approaches can be used as well, such as are discussed elsewhere herein. Once a relative location is determined in the image information, the device can use information such as the field of view of the camera, the position of the camera with respect to the device, the zoom level of the camera, and other such information to determine a relative direction of the user, with that relative direction being used for the point of view to use in rendering the interface.

When using a camera to track location, however, the accuracy is limited at least in part by the frame rate of the camera. Further, images take some time to process such that there can be some lag in the determinations. As changes in orientation and/or position of the device can occur relatively quickly, it can be desirable in at least some embodiments to enhance the accuracy of the point of view determinations. In some embodiments, a sensor or other such element of a computing device can be used to determine motions of the computing device, which can help adjust point of view determinations. The sensors can be any appropriate sensors capable of providing information about rotations and/or translations of the device, as may include accelerometers, inertial sensors, electronic gyroscopes, electronic compasses, and the like.

Figure 8A:
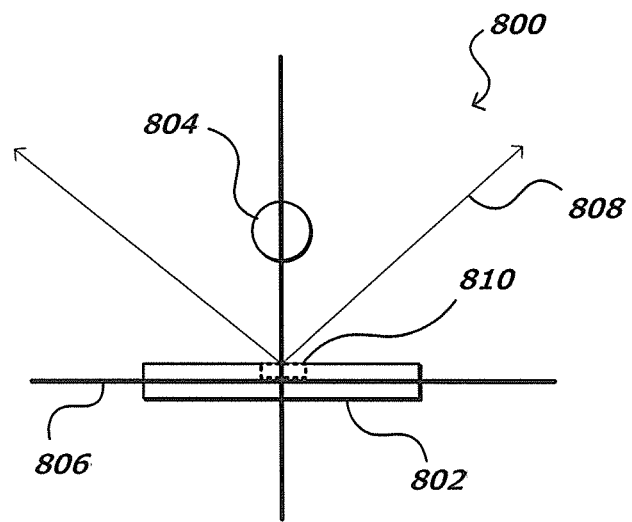
FIGS. 8A and 8B illustrate an example approach to determining device motion that can be utilized in accordance with various embodiments.

For example, FIG. 8A illustrates a "top view" 800 of a computing device 802 operable to capture an image of an object 804 (e.g., a user's head) within an angular view 808 of a camera 810 of the computing device. In this example, the computing device 802 includes at least one orientation- or rotation-determining element such as an electronic compass or electronic gyroscope that is able to determine a frame of reference 806 in two or three dimensions with respect to a first orientation of the device. In at least some embodiments, an electronic compass might be used to determine an axis of the frame of reference 806, as may correspond to a North direction, etc. In other embodiments, a component such as an electronic gyroscope might be calibrated periodically with a component such as a compass, but might instead determine changes in orientation along three axes of rotation over time. Various other approaches to determining changes in orientation along one, two, or three axes of rotation can be used as well within the scope of the various embodiments.

A first frame of reference 806 or orientation can be determined at or near the time of capture of a first image by a camera 810 of the computing device 802. In some embodiments, the determination can be triggered by receiving input to capture an image or another such action, but in other embodiments the frame of reference and/or orientation information can be updated periodically, such as several times a second based upon the type and/or configuration of the electronic gyroscope. The gyroscope can also be any appropriate electronic gyroscope component, such as a conventional MEMS gyroscope used in various consumer devices. Approaches for implementing and obtaining orientation changes from such a gyroscope are well known in the art and, as such, will not be discussed in detail herein.

Figure 8B:
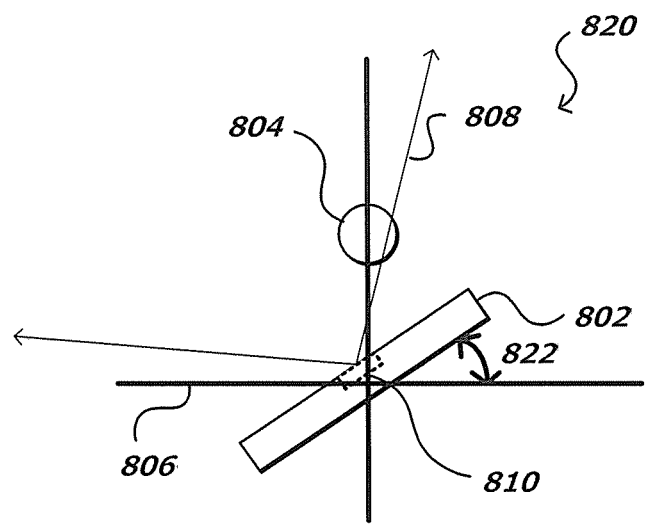

FIG. 8B illustrates a second top view 820 after a change in orientation of the computing device 802. The electronic gyroscope (or other such component or embedded sensor) can detect the change in orientation, in this example corresponding to a change in angle 822 with respect to the frame of reference in the plane of the figure. The gyroscope can present information about the change in orientation in any appropriate form, such as in angles or radians of change for one, two, or three degrees (e.g., $\Delta x$, $\Delta y$, $\Delta z$), percentage changes in pitch, roll, and yaw, etc. In this example, the change in orientation is determined to be a given angular amount of rotation 822 about a single axis. As illustrated, this causes the object 804 to be moved to the right edge of the field of view 808 of the camera 810. In at least some embodiments, the gyroscope may not be accurate enough to provide an exact amount of rotation, but can provide an approximation or estimate of the amount of rotation that can be used to narrow the search space and facilitate the location of corresponding objects in the images. Further, the information can provide a faster adjustment or prediction of relative position than can be provided from the camera in at least some embodiments. A similar approach can be used for translation, although the effects of translation on objects in captured images can be much less significant than angular changes, such that the image information might be sufficient to account for translation changes in at least some embodiments. In various embodiments an accelerometer or other inertial sensor can be used to track such changes given that the changes can also change the height of the portable capturing device.

Figure 9:
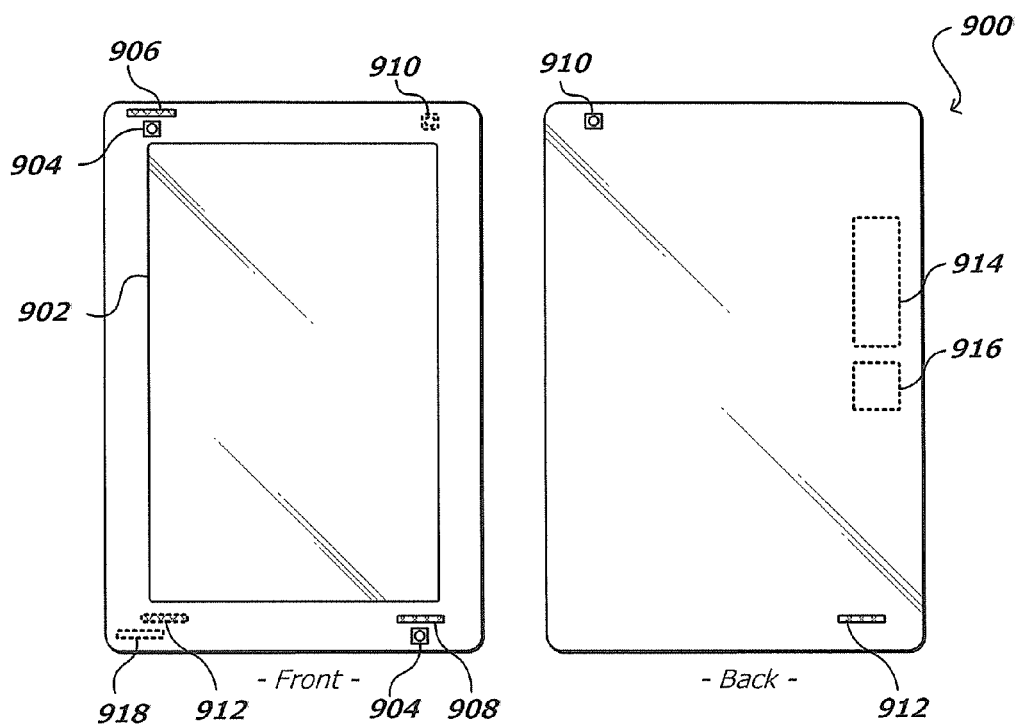
FIG. 9 illustrates an example of a computing device that can be used in accordance with various embodiments.

FIG. 9 illustrates front and back views of an example electronic computing device 900 that can be used in accordance with various embodiments. Although a portable computing device (e.g., a smartphone, an electronic book reader, or tablet computer) is shown, it should be understood that any device capable of receiving and processing input can be used in accordance with various embodiments discussed herein. The devices can include, for example, notebook computers, electronic book readers, personal data assistants, cellular phones, video gaming consoles or controllers, television set top boxes, and portable media players, among others.

In this example, the computing device 900 has a display screen 902 (e.g., an LCD element) operable to display information or image content to one or more users or viewers of the device. The display screen of some embodiments displays information to the viewers facing the display screen (e.g., on the same side of the computing device as the display screen). The computing device in this example can include one or more imaging elements, in this example including two image capture elements 904 on the front of the device and at least one image capture element 910 on the back of the device. It should be understood, however, that image capture elements could also, or alternatively, be placed on the sides or corners of the device, and that there can be any appropriate number of capture elements of similar or different types. Each image capture element 904 and 910 may be, for example, a camera, a charge-coupled device (CCD), a motion detection sensor or an infrared sensor, or other image capturing technology.

As discussed, the device can use the images (e.g., still or video) captured from the imaging elements 904 and 910 to generate a three-dimensional simulation of the surrounding environment (e.g., a virtual reality of the surrounding environment for display on the display screen of the device). Further, the device can utilize outputs from at least one of the image capture elements 904 and 910 to assist in determining the location and/or orientation of a user and in recognizing nearby persons, objects, or locations. For example, if the user is holding the device, the captured image information can be analyzed (e.g., using mapping information about a particular area) to determine the approximate location and/or orientation of the user. The captured image information may also be analyzed to recognize nearby persons, objects, or locations (e.g., by matching parameters or elements from the mapping information).

The computing device can also include at least one microphone or other audio capture elements capable of capturing audio data, such as words spoken by a user of the device, music being hummed by a person near the device, or audio being generated by a nearby speaker or other such component, although audio elements are not required in at least some devices. In this example there are three microphones, one microphone 908 on the front side, one microphone 912 on the back, and one microphone 906 on or near a top or side of the device. In some devices there may be only one microphone, while in other devices there might be at least one microphone on each side and/or corner of the device, or in other appropriate locations.

The device 900 in this example also includes one or more orientation- or position-determining elements 918 operable to provide information such as a position, direction, motion, or orientation of the device. These elements can include, for example, accelerometers, inertial sensors, electronic gyroscopes, and electronic compasses.

The example device also includes at least one communication mechanism 914, such as may include at least one wired or wireless component operable to communicate with one or more electronic devices. The device also includes a power system 916, such as may include a battery operable to be recharged through conventional plug-in approaches, or through other approaches such as capacitive charging through proximity with a power mat or other such device. Various other elements and/or combinations are possible as well within the scope of various embodiments.

Figure 10:
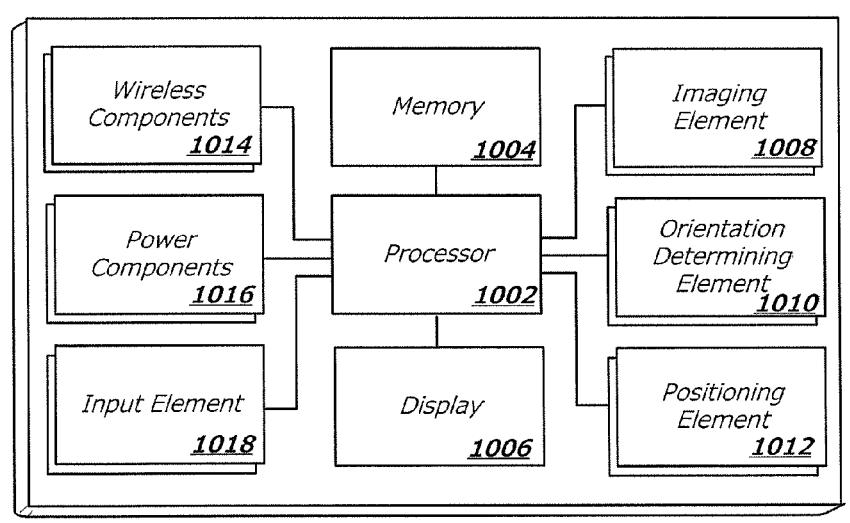
FIG. 10 illustrates an example configuration of components of a computing device such as that illustrated in FIG. 9.

FIG. 10 illustrates a set of basic components of an electronic computing device 1000 such as the device 1000 described with respect to FIG. 9. In this example, the device includes at least one processing unit 1002 for executing instructions that can be stored in a memory device or element 1004. As would be apparent to one of ordinary skill in the art, the device can include many types of memory, data storage, or computer-readable media, such as a first data storage for program instructions for execution by the processing unit(s) 1002, the same or separate storage can be used for images or data, a removable memory can be available for sharing information with other devices, and any number of communication approaches can be available for sharing with other devices.

The device typically will include some type of display screen 1006, such as a touch screen, electronic ink (e-ink), organic light emitting diode (OLED) or liquid crystal display (LCD), although devices such as portable media players might convey information via other means, such as through audio speakers.

As discussed, the device in many embodiments will include at least one imaging element 1008, such as one or more cameras that are able to capture images of the surrounding environment and that are able to image a user, people, or objects in the vicinity of the device. The image capture element can include any appropriate technology, such as a CCD image capture element having a sufficient resolution, focal range, and viewable area to capture an image of the user when the user is operating the device. Methods for capturing images using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device.

The example computing device 1000 also includes at least one orientation determining element 1010 able to determine and/or detect orientation and/or movement of the device. Such an element can include, for example, an accelerometer or gyroscope operable to detect movement (e.g., rotational movement, angular displacement, tilt, position, orientation, motion along a non-linear path, etc.) of the device 1000. An orientation determining element can also include an electronic or digital compass, which can indicate a direction (e.g., north or south) in which the device is determined to be pointing (e.g., with respect to a primary axis or other such aspect).

As discussed, the device in many embodiments will include at least a positioning element 1012 for determining a location of the device (or the user of the device). A positioning element can include or comprise a GPS or similar location-determining elements operable to determine relative coordinates for a position of the device. As mentioned above, positioning elements may include wireless access points, base stations, etc., that may either broadcast location information or enable triangulation of signals to determine the location of the device. Other positioning elements may include QR codes, barcodes, RFID tags, NFC tags, etc., that enable the device to detect and receive location information or identifiers that enable the device to obtain the location information (e.g., by mapping the identifiers to a corresponding location). Various embodiments can include one or more such elements in any appropriate combination.

As mentioned above, some embodiments use the element(s) to track the location of a device. Upon determining an initial position of a device (e.g., using GPS), the device of some embodiments may keep track of the location of the device by using the element(s), or in some instances, by using the orientation determining element(s) as mentioned above, or a combination thereof. As should be understood, the algorithms or mechanisms used for determining a position and/or orientation can depend at least in part upon the selection of elements available to the device.

The example device also includes one or more wireless components 1014 operable to communicate with one or more electronic devices within a communication range of the particular wireless channel. The wireless channel can be any appropriate channel used to enable devices to communicate wirelessly, such as Bluetooth, cellular, NFC, or Wi-Fi channels. It should be understood that the device can have one or more conventional wired communications connections as known in the art.

The device also includes a power system 1016, such as may include a battery operable to be recharged through conventional plug-in approaches, or through other approaches such as capacitive charging through proximity with a power mat or other such device. Various other elements and/or combinations are possible as well within the scope of various embodiments.

In some embodiments the device can include at least one additional input device 1018 able to receive conventional input from a user. This conventional input can include, for example, a push button, touch pad, touch screen, wheel, joystick, keyboard, mouse, keypad, or any other such device or element whereby a user can input a command to the device. These I/O devices could even be connected by a wireless infrared or Bluetooth or other link as well in some embodiments. Some devices also can include a microphone or other audio capture element that accepts voice or other audio commands. For example, a device might not include any buttons at all, but might be controlled only through a combination of visual and audio commands, such that a user can control the device without having to be in contact with the device.

In some embodiments, the device can have sufficient processing capability, and the imaging element and associated analytical algorithm(s) may be sensitive enough to distinguish between the motion of the device, motion of a user's head, motion of the user's eyes and other such motions, based on the captured images alone. In other embodiments, such as where it may be desirable for the process to utilize a fairly simple imaging element and analysis approach, it can be desirable to include at least one orientation determining element that is able to determine a current orientation of the device. In one example, the at least one orientation determining element is at least one single- or multi-axis accelerometer that is able to detect factors such as three-dimensional position of the device and the magnitude and direction of movement of the device, as well as vibration, shock, etc. Methods for using elements such as accelerometers to determine movement of a device are also known in the art and will not be discussed herein in detail. Other elements for detecting orientation and/or movement can be used as well within the scope of various embodiments for use as the orientation determining element. When the input from an accelerometer or similar element is used along with the input from the camera, the relative movement can be more accurately interpreted, allowing for a more precise input and/or a less complex image analysis algorithm.

Figure 11:
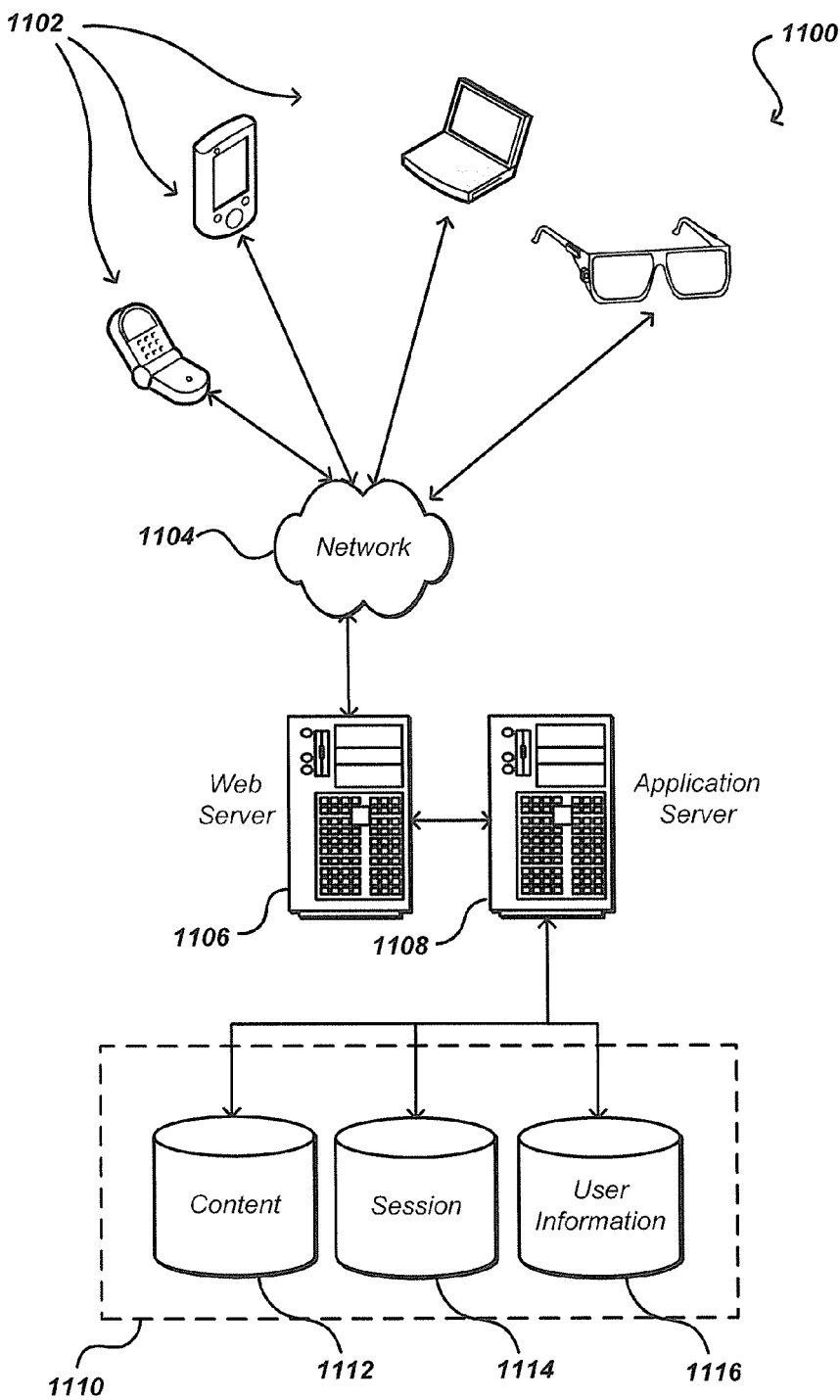
FIG. 11 illustrates an example environment in which various embodiments can be implemented.

As discussed, different approaches can be implemented in various environments in accordance with the described embodiments. For example, FIG. 11 illustrates an example of an environment 1100 for implementing aspects in accordance with various embodiments. As will be appreciated, although a Web-based environment is used for purposes of explanation, different environments may be used, as appropriate, to implement various embodiments. The system includes electronic client devices 1102, which can include any appropriate device operable to send and receive requests, messages or information over an appropriate network 1104 and convey information back to a user of the device. Examples of such client devices include personal computers, cell phones, handheld messaging devices, laptop computers, set-top boxes, personal data assistants, electronic book readers, surveillance cameras, cameras on vehicles, helmets and glasses, and the like. The network can include any appropriate network, including an intranet, the Internet, a cellular network, a local area network or any other such network or combination thereof. The network could be a "push" network, a "pull" network, or a combination thereof. In a "push" network, one or more of the servers push out data to the client device. In a "pull" network, one or more of the servers send data to the client device upon request for the data by the client device. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 1106 for receiving requests and serving content in response thereto, although for other networks, an alternative device serving a similar purpose could be used, as would be apparent to one of ordinary skill in the art.

The illustrative environment includes at least one application server 1108 and a data store 1110. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 1108 can include any appropriate hardware and software for integrating with the data store 1110 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 1106 in the form of HTML, XML or another appropriate structured language in this example. The handling of all requests and responses, as well as the delivery of content between the client devices 1102 and the application server 1108, can be handled by the Web server 1106. It should be understood that the Web and application servers are not required and are merely example components, as structured code discussed herein can be executed on any appropriate device or host machine as discussed elsewhere herein.

The data store 1110 can include several separate data tables, databases or other data storage mechanisms and media for storing data relating to a particular aspect. For example, the data store illustrated includes mechanisms for storing content (e.g., production data) 1112 and user information 1116, which can be used to serve content for the production side. The data store is also shown to include a mechanism for storing log or session data 1114. It should be understood that there can be other information that may need to be stored in the data store, such as page image information and access rights information, which can be stored in any of the above listed mechanisms as appropriate or in additional mechanisms in the data store 1110. The data store 1110 is operable, through logic associated therewith, to receive instructions from the application server 1108 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on anyone of the user devices 1102. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 11. Thus, the depiction of the system 1100 in FIG. 11 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display screen or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computing device, comprising:
    a display screen;
    a computing device processor;
    a front-facing camera;
    a rear-facing camera; and
    a memory device including instructions that, when executed by the computing device processor, cause the computing device to:
        capture first image data by the front-facing camera, the first image data including a representation of a user of the computing device;
        analyze the first image data to determine a bodily feature of the user;
        display an alignment element in an overlay on the display screen, the alignment element used to assist in positioning the user with respect to the front-facing camera;
        detect a change in orientation of the computing device with respect to user;

analyze the first image data to detect that a location of a representation of the bodily feature aligns with the alignment element within a threshold deviation;
capture second image data by the rear-facing camera, the second image data including a representation of an object;
analyze the second image data to determine a geometric relationship between the rear-facing camera and the object; and
determine, based at least in part on the geometric relationship, a distance to the object with respect to the computing device.

2. The computing device of claim 1, wherein the instructions, when executed further enable the computing device to:
analyze the first image data to detect that the location of the representation of the bodily feature is outside the alignment element; and
provide an alert to assist aligning the representation of the bodily feature with the alignment element.

3. The computing device of claim 1, wherein the instructions, when executed further enable the computing device to:
capture third image data by the rear-facing camera, the third image data including a representation of an object, the object being associated with a size that includes a height and a width; and
determine, based at least in part on the size, a distance between the object and the rear-facing camera.

4. The computing device of claim 1, wherein the instructions when executed further cause the computing device to:
performing facial recognition to determine whether information representative of at least one bodily feature of the user matches information stored for an authorized user of the computing device.

5. A computing device, comprising:
a display screen;
a computing device processor;
a first camera;
a second camera; and
a memory device including instructions that, when executed by the computing device processor, cause the computing device to:
capture first image data by the first camera, the first image data including a representation of a user of the computing device;
analyze the first image data to determine a position of the user with respect to the computing device;
determine, based at least in part on the position of the user, that a representation of a bodily feature of the user in the first image data aligns with an alignment element within a threshold amount of deviation;
capture second image data by the second camera, the second image data including a representation of an object; and
determine a distance to the object based at least in part on the second image data.

6. The computing device of claim 5, wherein the instructions when executed further cause the computing device to:
analyze the first image data to detect that a location of the representation of the bodily feature is outside the alignment element; and
provide an alert to assist aligning the representation of the bodily feature with the alignment element,
wherein the bodily feature includes at least one of a nose, an eye, a mouth, a head, shoulders, a chin, or a pair of ears.

7. The computing device of claim 6, wherein the alert is one of a visual indication, audio alert, or haptic alert.

8. The computing device of claim 5, wherein the instructions when executed further cause the computing device to:
analyze the second image data to determine a geometric relationship between the second camera and the object; and
determine, based at least in part on the geometric relationship, the distance to the object with respect to the computing device.

9. The computing device of claim 5, wherein the instructions when executed further cause the computing device to:
obtain third image data, the third image data including a representation of a second object, the second object associated with physical dimensions;
scaling, using at least one transformation algorithm, the physical dimensions to generate scaled dimensions based at least in part upon the distance; and
provide an augmented reality view that includes the representation of the second object displayed at the distance at the scaled dimensions.

10. The computing device of claim 9, wherein the augmented reality view is presented at least partially overlying the second image data as displayed on the display screen.

11. The computing device of claim 5, wherein the computing device further includes an inertial determining component configured to measure at least a tilt of the computing device, and wherein the instructions when executed to capture the second image further cause the computing device to:
determine the tilt of the computing device with respect to a reference plane to generate a tilt measurement;
provide a display of the tilt measurement on the display screen; and
determine the tilt measurement meets a tilt threshold.

12. The computing device of claim 5, wherein the instructions when executed to determine that the representation of the bodily feature aligns with the alignment element further cause the computing device to:
determine a first interest point and a second interest point of the bodily feature; and
determine that the alignment element intersects the first interest point and the second interest point.

13. The computing device of claim 5, wherein the instructions when executed further cause the computing device to:
capture third image data by the second camera, the third image data including a representation of an object, the object being associated with a size that includes a height and width; and
determine, based at least in part on the size, a distance between the object and the second camera.

14. The computing device of claim 5, wherein the instructions when executed further cause the computing device to:
analyze the first image data to determine whether information representative of at least one bodily feature of the user matches information stored for an authorized user of the computing device.

15. The computing device of claim 14, wherein analyzing the first image data is performed at least in part using at least one of a feature recognition algorithm, a facial recognition algorithm, or a shape recognition algorithm.

16. The computing device of claim 5, wherein the orientation of the computing device is determined based at least in part on one of images captured by one of the first camera or the second camera, or at least one sensor.

17. A method, comprising:
capturing first image data by a first camera of a computing device, the first image data including a representation of a user of the computing device;
analyzing the first image data to determine a position of the user with respect to the computing device;
determining, based at least in part on the position of the user, that a representation of a bodily feature of the user in the first image data aligns with an alignment element within a threshold amount of deviation;
capturing second image data by a second camera of the computing device, the second image data including a representation of an object; and
determining a distance to the object based at least in part on the second image data.

18. The method of claim 17, further including:
analyzing the first image data to detect that a location of the representation of the bodily feature is outside the alignment element; and
providing an alert to assist aligning the representation of the bodily feature with the alignment element, wherein the bodily feature includes at least one of a nose, an eye, a mouth, a head, shoulders, a chin, or a pair of ears, and wherein the alert is one of a visual indication, audio alert, or haptic alert.

19. The method of claim 17, further comprising:
analyzing the second image data to determine a geometric relationship between the second camera and the object; and
determining, based at least in part on the geometric relationship, the distance to the object with respect to the computing device.

20. The method of claim 17, further comprising:
obtaining third image data, the third image data including a representation of a second object, the second object associated with physical dimensions;
scaling, using at least one transformation algorithm, the physical dimensions to generate scaled dimensions based at least in part upon the distance; and
providing an augmented reality view that includes the representation of the second object displayed at the distance at the scaled dimensions, wherein the augmented reality view is presented at least partially overlying the second image data as displayed on a display screen of the computing device.

* * * * *